Figure 1:
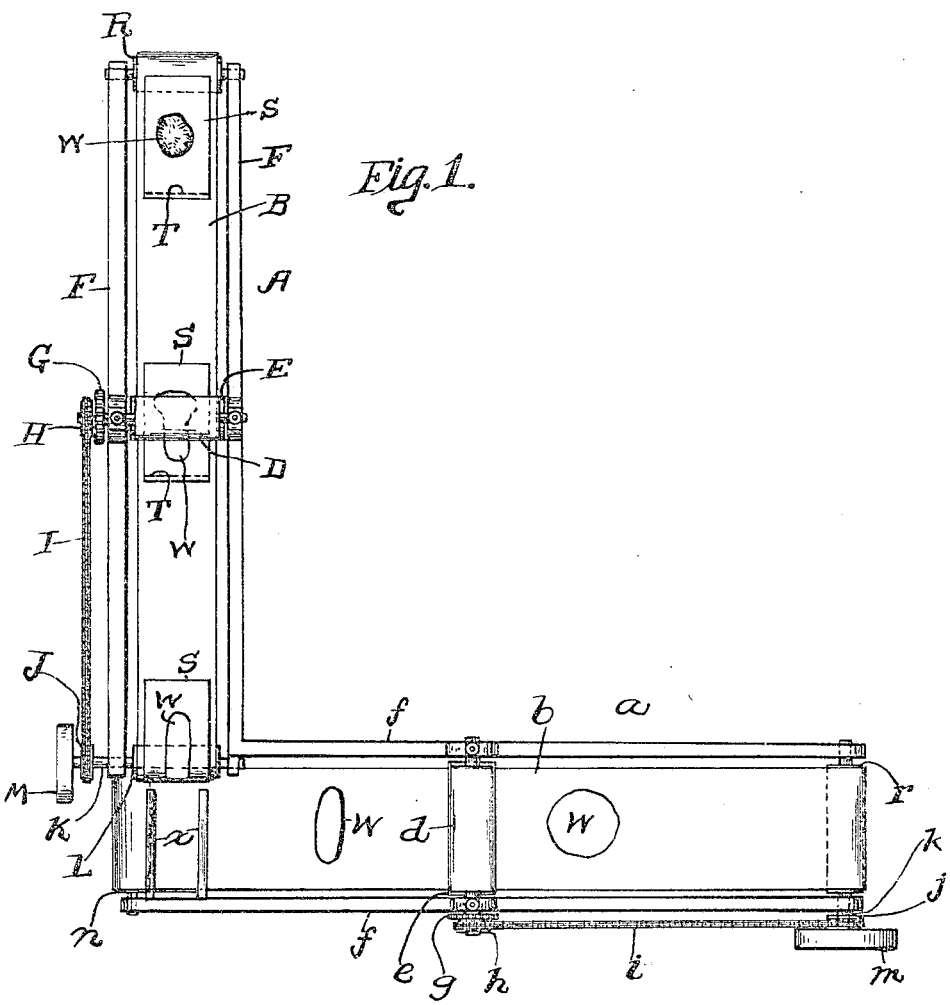

No. 787,274. PATENTED APR. 11, 1905.
J. H. BURNS.
SPREADING DOUGH FOR THE MAKING OF PIE CRUSTS.
APPLICATION FILED SEPT. 25, 1903.

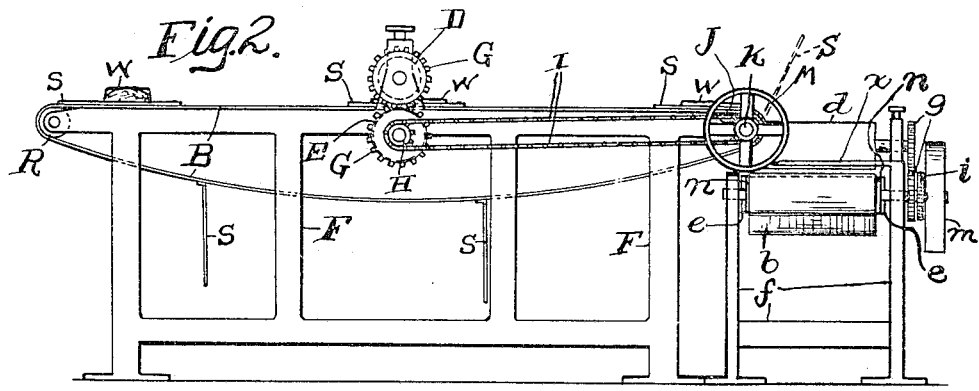
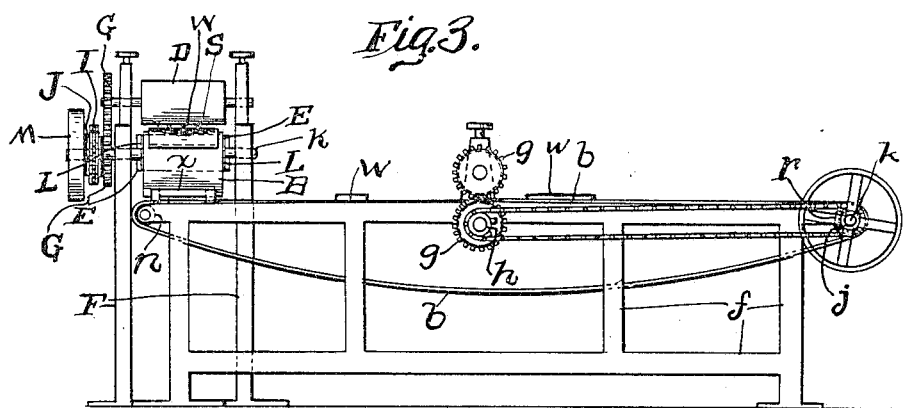
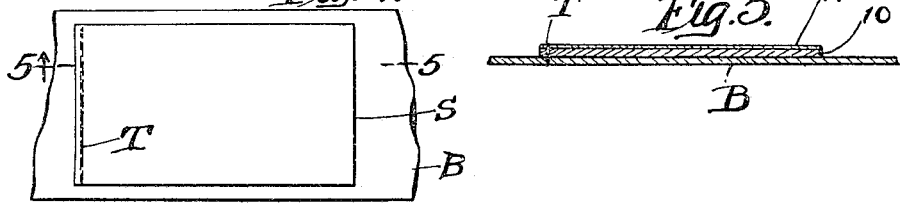

No. 787,274. Patented April 11, 1905.

UNITED STATES PATENT OFFICE.

JOSEPH H. BURNS, OF CLEVELAND, OHIO.

SPREADING DOUGH FOR THE MAKING OF PIE-CRUSTS.

SPECIFICATION forming part of Letters Patent No. 787,274, dated April 11, 1905.

Application filed September 25, 1903. Serial No. 174,605.

*To all whom it may concern:*

Be it known that I, JOSEPH H. BURNS, a citizen of the United States of America, residing at Cleveland, in the county of Cuyahoga and State of Ohio, have invented certain new and useful Improvements in Spreading Dough for the Making of Pie-Crusts; and I hereby declare the following to be a full, clear, and exact description of the invention, such as will enable others skilled in the art to which it pertains to make and use the same.

This invention relates to improvements in the art of spreading dough for the making of pie-crusts; and it consists more especially in an improved method comprising, first, the feeding of a chunk or piece of dough on and by a movable surface and so rolling the said piece while the latter is being fed as to elongate the piece of dough longitudinally of the path of the said surface, then lifting the elongated piece of dough and turning it over and depositing it crosswise of the path of and onto another movable surface and then rolling the elongated and overturned piece of dough longitudinally of the path of and upon the last-mentioned surface.

The object of this invention is to roll chunks or pieces of dough into an approximately circular shape or layer economically and with great facility.

Another object is to roll, and thereby elongate, a chunk or piece of dough upon an elastic and compressible surface and prevent the accruing of detrimental results from unevenness of or undue pressure upon the dough and avoid interference with the homogeneity of the dough.

With these objects in view this invention consists in the improved steps or process hereinafter described, and pointed out in the claims.

In the accompanying drawings, Figure 1 is a top plan of a machine or apparatus suitable for use in carrying out the invention which constitutes the subject-matter of this application. Figs. 2 and 3 are elevations taken at right angles to each other. Fig. 4 is a top plan of a portion of the apron-carrying belt or conveyer of the apparatus. Fig. 5 is a section on line 5 5, Fig. 4, looking in the direction indicated by the arrow.

Referring to the drawings, A and *a* designate two dough-rolling tables arranged at right angles to each other, with the table A somewhat higher than the table *a*. The table A comprises a dough-feeding endless belt or conveyer B, which is instrumental in forming the upper surface of the said table, with the upper and dough-feeding portion of the said conveyer arranged in a horizontal plane. The table *a* comprises an endless belt or conveyer *b*, which is instrumental in forming the upper surface of the said table *a*, with the upper and dough-feeding portion of the said conveyer arranged in a horizontal plane. The upper and dough-feeding portion of the conveyer *b* is arranged at an elevation a suitable distance below the upper and dough-feeding portion of the conveyer B. The conveyer B is employed in the feeding of partially-rolled pieces of dough to the conveyer *b*. Preferably the conveyer B, at the dough-delivering end of the table A, somewhat overhangs the conveyer *b* at the dough-receiving end of the table *a*. Obviously the conveyer B is actuated in the direction required to feed dough rolled thereon, as will hereinafter appear, to the conveyer *b*, and the latter is actuated in the direction required to feed the dough delivered thereto away from the conveyer B.

Any approved means for operating the conveyers B and *b* may be provided, and each table is provided with suitable means for rolling the pieces of dough fed by the conveyer of the said table. As shown, the table A comprises two horizontal rolls D and E, which extend transversely of the said table at the upper side and lower side, respectively, of the upper and dough-feeding portion of the conveyer B and are arranged at a right angle to the said conveyer. The rolls D and E are arranged in the same plane vertically, and the lower roll E forms a bottom bearing for the upper and dough-feeding portion of the conveyer B. The said rolls are supported in any approved manner from the stationary framework F of the table A and are intergeared at one end with each other, as at G, so that the said rolls during their rotation turn in opposite directions, respectively, as required, and one of the gears G employed in establishing operative connection between the rolls D and E is operatively provided with a sprocket-wheel H, which is arranged in line axially with the respective gear and operatively connected by a chain I with a sprocket-wheel J, which is operatively mounted on a trunnion K of a roller L, over which the conveyer B of the table A leads at the dough-delivering end of the said table, which roller is supported from the framework F and employed in actuating the said conveyer. The roller L is operatively provided with a driving-wheel M, to which power is applied in any approved manner. The conveyer B of the table A leads at the dough-receiving end of the said table over a guide-roller R, which is supported from the framework F. The parts are so arranged and timed that chunks or pieces of dough delivered to the conveyer B in advance of the upper roll D are fed in under the said roll to the conveyer $b$ of the table $a$ and rolled, and thereby elongated longitudinally of the conveyer B during their passage to the conveyer $b$.

The conveyer B is provided at its outer side with aprons S, spaced equidistantly and arranged longitudinally of the said conveyer. Each apron S is attached at its forward end only, preferably by stitching the said apron at the said end, as at T, to and transversely of the conveyer to the said conveyer, so that the said apron is capable of being swung upwardly and in the direction of the table $a$, as will hereinafter more clearly appear.

The rolls D and E are located, preferably, centrally between the ends of the table A.

A chunk W of dough to be rolled and spread is placed upon each apron S as the said apron during the actuation of the conveyer B approaches the roll D. A chunk W of dough having been placed upon an apron S preparatory to the feeding of the same to and in under the roll D is operated upon during its passage in under the said roll and rolled, and thereby spread longitudinally of the said apron, and consequently longitudinally of the conveyer B. Fig. 1 illustrates the feeding of a chunk of dough to be rolled, one chunk of dough being rolled, and thereby elongated longitudinally of the table A, and a chunk of dough having been elongated upon the said table and about to be delivered to the conveyer of the table $a$. Of course each apron S preparatory to the deposit thereon of a chunk of dough is suitably floured, and the said chunk of dough is floured on top preparatory to its passage under the roll D.

The aprons S are flexible and yet sufficiently stiff to render them capable of swinging upwardly toward and over the table $a$ during the passage of the said aprons around the driving-roller L. In dotted lines, Fig. 2, a dough-laden apron is shown swinging from the table A upwardly toward and over the table $a$. Obviously each dough-laden apron S of the conveyer B in swinging from over the said conveyer toward and over the conveyer $b$ of the table $a$ overturns its load—an elongated chunk of dough—and deposits the latter onto and transversely of and at a right angle to the said last-mentioned conveyer.

Each apron S consists, preferably, of a sheet 10, of rubber or other elastic and compressible material, covered by a sheet 12, of canvas or similarly closely-woven textile fabric, as shown in Fig. 5, with the canvas arranged to form the upper side of the apron during the travel of the apron over the table A. Each apron S forms, therefore, an elastic and compressible seat for a chunk of dough to be operated upon, and although the yielding capability of the seat thus formed is quite desirable I have found that the canvas forms a more suitable surface on which to operate upon the dough than rubber.

In rolling of a chunk or piece of dough upon a canvas-covered, elastic, and compressible apron S, and thereby elongating the said piece of dough longitudinally of the conveyer B, slipping of the dough upon the said conveyer during the operation of the upper roll D upon the dough is prevented, and the accruing of detrimental results from unevenness or undue pressure upon the dough and interference with the homogeneity of the dough are avoided.

To prevent the aprons S from flapping directly against the conveyer $b$ of the table $a$ during the delivery of the partially-rolled dough from the table A onto the table $a$, the stationary framework $f$ of the table $a$ is provided, over the said table $a$ and in suitable proximity to the upper surface of the upper and dough-feeding portion of the said conveyer, with two arms $x$, which are arranged transversely of the said conveyer and arranged such a distance apart longitudinally of the conveyer and in such position relative to the apron-carrying conveyer B of the table A that each apron S of the said apron-carrying conveyer will, upon swinging toward and over the table $a$, flap against the said arms, so that any partially-rolled dough carried by the said apron will be positively freed from the apron and fall overturned between the said arms onto the conveyer $b$ of the table $a$, and any flour on the said apron will be shaken from the apron and deposited onto and distributed over the overturned elongated piece of dough. It will be observed, therefore, that the arrangement of the parts is such that a chunk or piece of dough elongated upon the table A is, during its delivery from the said table to the table $a$, deposited upon the latter crosswise of the dough-feeding conveyer $b$ of the last-mentioned table. An apron S having struck against the pair of arms $x$ of the table $a$ and delivered partially-rolled dough to the said table is, during the actuation of the conveyer carrying the said apron, removed from the table $a$ and from over the dough thus delivered onto the said table, and another dough-laden apron approaches the said table.

As shown, the table $a$ comprises two horizontal rolls $d$ and $e$, which extend transversely of the said table at the upper side and lower side, respectively, of the upper and dough-feeding portion of the conveyer $b$ and are arranged at a right angle to the said conveyer. The rolls $d$ and $e$ are arranged in the same plane vertically and preferably about centrally between the ends of the table $a$. The lower roll $e$ forms a bottom bearing for the upper and dough-feeding portion of the conveyer $b$. The rolls $d$ and $e$ are suitably supported from the framework $f$ and are intergeared with each other at one end, as at $g$, so that the said rolls during their rotation turn in opposite directions, respectively, as required. One of the gears $g$, establishing operative connection between the rolls $d$ and $e$, is operatively provided with a sprocket-wheel $h$, which is arranged in line axially with the respective gear and operatively connected by a chain $i$ with a sprocket-wheel $j$, which is operatively mounted on a trunnion $k$ of the roller $r$, over which the conveyer $b$ leads, which roller is instrumental in actuating the said conveyer. The conveyer $b$ of the table $a$ leads at the dough-receiving end of the said table over a suitably-supported guide-roller $n$, and the roller $r$ is arranged at the opposite end of the said table and supported from the framework $f$. The roller $r$ is operatively provided with a driving-wheel $m$, to which power is applied in any approved manner.

By the arrangement of the parts hereinbefore described it will be observed that the partially-rolled and elongated pieces of dough delivered from the conveyer B of the table A to and crosswise of the conveyer $b$ of the table $a$ are fed to and in under and rolled by the roll $d$ of the last-mentioned table, and thereby spread into an approximately circular layer, as shown.

Fig. 1 of the drawings illustrates the feeding of a partially-rolled elongated piece of dough to the roll $d$ and another piece of dough having been operated upon by the said roll and in the form of a circular layer ready to be removed from the table $a$.

What I claim is—

1. An improvement in the art of spreading dough for the making of pie-crusts, consisting, first, in depositing a chunk or piece of dough upon a moving surface and so rolling the dough in one and the same plane vertically upon the said surface as to elongate the piece of dough longitudinally of the path of the said surface, and then delivering the partially-rolled and elongated piece of dough crosswise of the path of and onto another movable surface and there so rolling the partially-rolled dough in one and the same plane vertically and longitudinally of the path of the said last-mentioned surface as to form an approximately circular layer of dough.

2. An improvement in the art of spreading dough for the making of pie-crusts, comprising the depositing of a chunk or piece of dough upon a moving surface and rolling the dough longitudinally of the path of the said surface so as to elongate the piece of dough longitudinally of the said path, and then delivering the elongated piece of dough crosswise of the path of and onto another movable surface and there rolling the partially-rolled dough longitudinally of the path of the last-mentioned surface.

3. An improvement in the art of spreading dough for the making of pie-crusts, comprising the depositing of a chunk or piece of dough upon a moving surface and elongating the piece of dough longitudinally of the path of the said surface, and then delivering the elongated piece of dough crosswise of the path of and onto another movable surface and there rolling the partially-spread and elongated piece of dough longitudinally of the path of the last-mentioned surface.

4. An improvement in the art of spreading dough for the making of pie-crusts, comprising the depositing of a chunk or piece of dough upon a moving surface and rolling and thereby elongating the piece of dough longitudinally of the path of the said surface, and then delivering the elongated piece of dough crosswise of the path of and onto another movable surface and spreading the dough longitudinally of the path of the last-mentioned surface.

5. An improvement in the art of spreading dough for the making of pie-crusts, comprising the feeding of a chunk or piece of dough on and by a movable surface, and so rolling the said piece while the latter is being fed so as to elongate the piece of dough longitudinally of the path of the said surface, then lifting the elongated piece of dough and turning it over and depositing it crosswise of the path of and onto another movable surface, and then rolling the elongated and over-turned piece of dough longitudinally of the path of and upon the last-mentioned surface.

6. An improvement in the art of spreading dough for the making of pie-crusts, consisting, first, in so rolling a chunk or piece of dough in one and the same plane vertically as to form an oblong piece of dough, and then rolling the partially-rolled oblong piece of dough widthwise of the said piece on a moving surface in one and the same plane vertically to form an approximately circular layer of dough.

7. An improvement in the art of spreading dough for the making of pie-crusts, consisting in rolling a chunk or piece of dough into an oblong shape, and then rolling the partially-rolled oblong piece of dough widthwise of the said piece on a moving surface and spreading the dough longitudinally of the path of the said surface.

8. An improvement in the art of spreading dough for the making of pie-crusts, consisting in spreading a chunk or piece of dough upon a moving surface into an oblong shape, and then delivering the elongated piece of dough crosswise of the path of and onto another moving surface and there rolling the partially-rolled oblong piece of dough longitudinally of the path of the last-mentioned surface.

9. An improvement in the art of spreading dough for the making of pie-crusts, comprising the rolling of a chunk or piece of dough into an oblong shape, and then rolling the partially-rolled oblong piece of dough withwise of the said piece on a moving surface and spreading the dough longitudinally of the path of the said surface, and turning the dough over preparatory to the last-mentioned spreading of the dough.

10. An improvement in the art of spreading dough for the making of pie-crusts, comprising the feeding of a chunk or piece of dough on and by a moving surface, and rolling the moving piece of dough into an oblong shape, then lifting the oblong piece of dough and turning it over and depositing it crosswise of the path of a moving surface, and then rolling the elongated and overturned piece of dough longitudinally of the path of and upon the last-mentioned surface.

In testimony whereof I sign the foregoing specification, in the presence of two witnesses, at Cleveland, Ohio.

JOSEPH H. BURNS.

Witnesses:
C. H. DORER,
G. M. HAYES.